US012335678B2

(12) United States Patent
D'Agostino et al.

(10) Patent No.: US 12,335,678 B2
(45) Date of Patent: Jun. 17, 2025

(54) AUDIO LIMITER

(71) Applicant: BOSE CORPORATION, Framingham, MA (US)

(72) Inventors: Michael S. D'Agostino, North Billerica, MA (US); Harold Arthur Cheyne, Westborough, MA (US)

(73) Assignee: Bose Corporation, Framingham, MA (US)

( * ) Notice: Subject to any disclaimer, the term of this patent is extended or adjusted under 35 U.S.C. 154(b) by 189 days.

(21) Appl. No.: 18/184,945

(22) Filed: Mar. 16, 2023

(65) Prior Publication Data

US 2024/0314486 A1 Sep. 19, 2024

(51) Int. Cl.

| | |
|---|---|
| ***H04R 1/10*** | (2006.01) |
| ***H04R 3/04*** | (2006.01) |
| ***H04R 5/04*** | (2006.01) |

(52) U.S. Cl.

CPC ............ *H04R 1/1083* (2013.01); *H04R 3/04* (2013.01); *H04R 5/04* (2013.01)

(58) Field of Classification Search

None

See application file for complete search history.

(56) References Cited

U.S. PATENT DOCUMENTS

| | | | |
|---|---|---|---|
| 11,087,776 B2 | 8/2021 | Rule et al. | |
| 2013/0129106 A1 | 5/2013 | Sapiejewski | |
| 2015/0243271 A1 | 8/2015 | Goldstein | |
| 2016/0165361 A1 | 6/2016 | Miller et al. | |
| 2019/0174218 A1* | 6/2019 | Kumar | H04R 1/1041 |
| 2021/0335336 A1 | 10/2021 | Rule | |
| 2022/0157291 A1 | 5/2022 | McCutcheon | |
| 2023/0060353 A1* | 3/2023 | Gandhi | G10K 11/17855 |

OTHER PUBLICATIONS

International Search Report and Written Opinion for International Application No. PCT/US2024/011248 Mailed Apr. 25, 2024.

* cited by examiner

*Primary Examiner* — James K Mooney
(74) *Attorney, Agent, or Firm* — Patterson + Sheridan, LLP

(57) ABSTRACT

Aspects of the present disclosure provide techniques, including devices and system implementing the techniques, to dynamically adjust an audio limiter in an ANR audio output device. The audio limiter adaptively adjusts how much and when to limit incoming audio based on a determined state of the device relative to a user wearing the device. The state of the device is determined based on the quality of the seal or fit between the earcup and the user's ear or head. When the fit is poor or leaky, the audio limiter limits the lower frequency portions of the incoming audio signal in an effort to mitigate distortion. Advantageously, when the fit is good, the audio limiter does not limit or reduce the amount of limiting of the low frequency portion of the audio signal.

20 Claims, 4 Drawing Sheets

AUDIO LIMITER

FIELD

Aspects of the disclosure generally relate to adaptively adjusting an audio limiter in active noise reduction (ANR) headphones based, at least in part, on a determined state of the headphones relative the user's head or ears.

BACKGROUND

A tight seal between a user's head and earcups of an audio output device is important for ANR functionality. Methods for improving ANR functionality to create a better listening experience are desirable.

SUMMARY

All examples and features mentioned herein can be combined in any technically possible manner. Aspects provide methods and devices for adjusting an audio limiter in real-time based on a determined state of the device. When a leaky condition is detected, the audio limiter adjusts a low frequency portion of an audio signal in an effort to reduce distortion. Advantageously, when a leaky condition is not detected, the audio limiter may decrease or eliminate limiting the audio signal, thereby increasing system performance.

Aspects provide a method performed by active noise reduction (ANR) headphones comprising: determining a state of the headphones relative to a user wearing the headphones; and adaptively adjusting an audio limiter based, at least in part, on the determined state.

In aspects, the state indicates a characteristic of a fit between an earcup of the headphones and the user's ear or head. In aspects, determining the state of the headphones comprises: determining the state of the headphones based, at least in part, on a feedback signal.

In aspects, the method further comprises measuring, at a first tap, a feedback signal downstream of a feedback filter in an earcup of the headphones. The state of the headphones relative to the user is determined based on the measured feedback signal.

In aspects, adaptively adjusting the audio limiter comprises reducing a bass portion of an incoming audio signal based on the measured feedback signal. In aspects, the method further comprises filtering the feedback signal downstream of the feedback filter to generate a low pass filtered feedback signal and delaying the low pass filtered signal to generate a delayed, low pass filtered feedback signal. In aspects, adaptively adjusting the audio limiter comprises adjusting the bass portion of the incoming audio signal based on the delayed, low pass filtered feedback signal.

In aspects, determining the state of the headphones comprises determining the state of the headphones based, at least in part, on a feedback signal measured at a first tap or a feedforward signal measured at a second tap.

Aspects provide an active noise reduction (ANR) audio output device, comprising a memory comprising computer-executable instructions; and a processor configured to execute the executable instructions and cause the audio output device to: determine a state of the audio output device relative to a user wearing the audio output device; and adaptively adjust an audio limiter based, at least in part, on the determined state.

In aspects, the state indicates a characteristic of a fit between an earcup of the audio output device and the user's ear or head.

In aspects, the computer-executable instructions for determining the state of the audio output device comprise instructions for determining the state of the audio output device based, at least in part, on a feedback signal.

In aspects, the processor is configured to further cause the ANR audio output device to measure, at a first tap, a feedback signal downstream of a feedback filter in an earcup of the audio output device. In aspects the state of the audio output device relative to the user is determined based on the feedback signal.

In aspects, the computer-executable instructions for adaptively adjusting the audio limiter comprise instructions for reducing a bass portion of an incoming audio signal based on a signal processed version of the feedback signal.

In aspects, the processor is configured to further cause the ANR audio output device to filter the feedback signal downstream of the feedback filter to generate a low pass filtered feedback signal and delay the low pass filtered signal to generate a delayed, low pass filtered feedback signal. In aspects, adaptively adjusting the audio limiter comprises adjusting the bass portion of the incoming audio signal based on the delayed, low pass filtered feedback signal.

In aspects, the computer-executable instructions for determining the state of the ANR audio output device comprise instructions for determining the state of the audio output device based, at least in part, on a feedback signal measured at a first tap or a feedforward signal measured at a second tap.

Aspects provide non-transitory computer-readable medium comprising executable instructions that, when executed by a processor of active noise reduction (ANR) headphones, cause the ANR headphones to perform operations comprising: determining a state of the headphones relative to a user wearing the headphones; and adaptively adjusting an audio limiter based, at least in part, on the determined state.

In aspects, the state indicates a characteristic of a fit between an earcup of the headphones and the user's ear or head. In aspects, determining the state of the headphones comprises determining the state of the headphones based, at least in part, on a feedback signal.

In aspects, the instructions further cause the ANR headphones to perform operations comprising measuring, at a first tap, a feedback signal downstream of a feedback filter in an earcup of the headphones. In aspects, the state of the headphones relative to the user is determined based on the measured feedback signal.

In aspects, adjusting the audio limiter comprises reducing a bass portion of an incoming audio signal based on the measured feedback signal.

In aspects, the instructions further cause filtering the feedback signal downstream of the feedback filter to generate a low pass filtered feedback signal and delaying the low pass filtered signal to generate a delayed, low pass filtered feedback signal. In aspects, adaptively adjusting the audio limiter comprises adjusting the bass portion of the incoming audio signal based on the delayed, low pass filtered feedback signal.

Two or more features described in this disclosure, including those described in this summary section, may be combined to form implementations not specifically described herein.

The details of one or more implementations are set forth in the accompanying drawings and the description below.

Other features, objects, and advantages will be apparent from the description and drawings, and from the claims.

DETAILED DESCRIPTION

Figure 1:
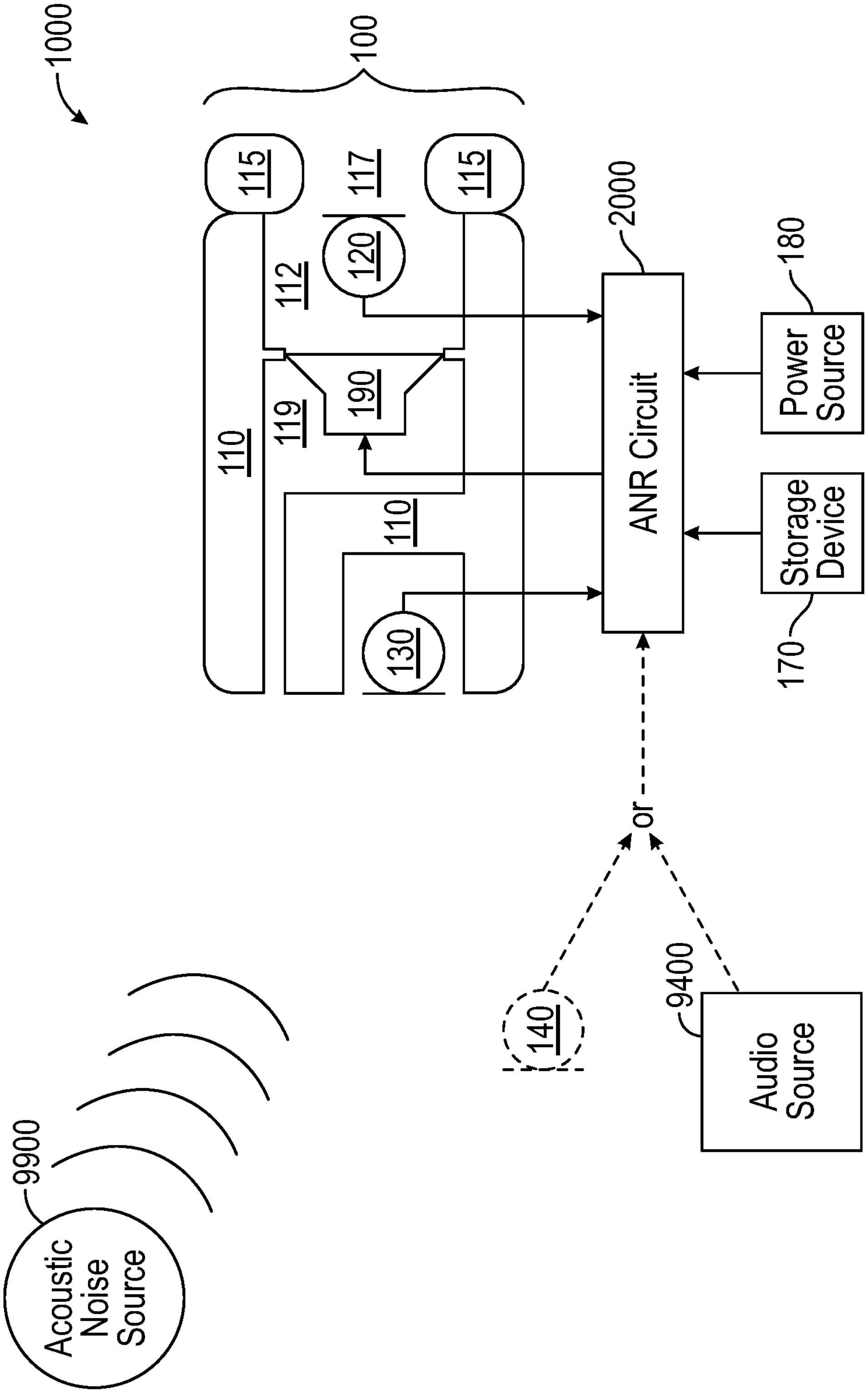
FIG. 1 is a block diagram of portions of an implementation of a personal ANR device.

Aspects of the present disclosure provide techniques, including headphones and ANR systems implementing the techniques, to dynamically adjust an audio limiter in an ANR audio output device (ANR headphones). The audio limiter adaptively adjusts both how much and when to limit incoming audio based on a determined state of the device relative to a user wearing the device. As described herein, in aspects, the audio limiter adaptively adjusts the low frequency portion of an incoming audio signal based on the determined state of the headphones. The lower frequency portion is dynamically limited based on the state of the headphones because it is the portion of the incoming audio likely to cause the most distortion.

The state of the device is determined based on the quality of the seal or fit between the earcup of the headphones and the user's ear or head. The state varies from a good fit to a poor or leaky fit. Based on the extent to which the fit is good or leaky, the audio limiter adaptively limits the lower frequency portions of the incoming audio signal. When the fit is poor or leaky, the audio limiter limits the low frequency portion of the audio signal in an effort to mitigate distortion more than when the fit is good. Advantageously, the audio limiter does not limit or reduces the amount of limiting of the low frequency portion of the audio signal when the fit is good or is becoming better. Alternatively or additionally, the state of the device may be determined based, at least in part, on an ANR state of the device. For example, the device may execute algorithms that modulate (or modify) the feedback loop, including the feedback filter (Kfb), thereby affecting the operating state of the ANR system. By way of illustration, U.S. Pat. No. 9,922,636 (hereinafter "the '636 patent"), titled "Mitigation of unstable conditions in an active noise control system," describes an algorithm that operates to mitigate instability in an ANR system and U.S. Pat. No. 11,164,554 (hereinafter "the '554 patent"), titled "Wearable active noise reduction (anr) device having low frequency feedback loop modulation," describes an algorithm that operates to modulate the feedback loop gain to keep driver voltage from going too high in response to a low frequency event that is otherwise too loud for the system to handle. Either or both of these algorithms may be executed by the device and such modulation of the feedback loop may be taken into account when determining the state of the device. By way of example, the algorithm described in the '554 patent has the ability to modify or modulate the feedback loop gain in both directions. If the noise or signal levels are low, it can increase the feedback loop gain. In that case, more limiting may be required or desirable if the audio (e.g., music) was loud. Alternatively, the '554 patent can reduce the feedback loop gain when the noise or signal levels are high. In that case, less or even no limiting of the audio may be required. The algorithm described in the '636 patent acts in a similar manner by changing the feedback loop gain, but generally only in one direction. An indication of such modulation of the feedback loop may be provided, e.g., from the aforementioned algorithms, as separate input to the limiter. Accordingly, the audio limiter may be designed in a way that it can respond to changes in the feedback loop and continuously provide the maximum audio performance that the system is capable of delivering based on the fit quality, the ANR state based on the algorithms described in the '554 patent and the '636 patent, and any other algorithm that can modulate the feedback loop. The complete disclosures of U.S. Pat. Nos. 9,922,636 and 11,164,554 are incorporated herein by reference.

FIG. 1 provides a block diagram of a personal active noise reduction (ANR) device (audio output device, headphones) 1000 in accordance with aspects of the present disclosure. The device 1000 may include a pair of earpieces 100 connected by a band, such as an over-the-head band (102 in FIG. 2), to provide ANR to both of the user's ears. For sake of simplicity of discussion, only a single earpiece 100 is depicted and described in relation to FIG. 1. As will also be explained in greater detail, the personal ANR device 1000 incorporates at least one ANR circuit 2000 that may provide either or both of feedback-based ANR and feedforward-based ANR, in addition to possibly further providing pass-through audio.

Each earpiece 100 incorporates a casing 110 having a cavity 112 at least partly defined by the casing 110 and by at least a portion of an acoustic driver 190 disposed within the casing to acoustically output sounds to a user's ear. This manner of positioning the acoustic driver 190 also partly defines another cavity 119 within the casing 110 that is separated from the cavity 112 by the acoustic driver 190. The casing 110 carries an car coupling 115 surrounding an opening to the cavity 112 and having a passage 117 that is formed through the car coupling 115 and that communicates with the opening to the cavity 112. In some implementations, an acoustically transparent screen, grill or other form of perforated panel (not shown) may be positioned in or near the passage 117 in a manner that obscures the cavity and/or the passage 117 from view for aesthetic reasons and/or to protect components within the casing 110 from damage. The passage 117 acoustically couples the cavity 112 to the car canal of the user's ear, while the car coupling 115 engages portions of the car to form at least some degree of acoustic seal therebetween. This acoustic seal enables the casing 110, the car coupling 115 and portions of the user's head surrounding the car canal (including portions of the car) to cooperate to acoustically isolate the cavity 112, the passage 117 and the ear canal from the environment external to the casing 110 and the user's head to at least some degree, thereby providing some degree of passive noise reduction.

In aspects, a feedforward microphone 130 is disposed on the exterior of the casing 110 or in any manner that is acoustically accessible to the environment external to the casing 110. This external positioning of the feedforward microphone 130 enables the feedforward microphone 130 to detect environmental noise sounds, such as those emitted by an acoustic noise source 9900, in the environment external to the casing 110 without the effects of any form of passive noise reduction or ANR provided by the personal ANR device 1000. As those familiar with feedforward-based ANR will readily recognize, these sounds detected by the feedforward microphone 130 are used as a reference from which feedforward anti-noise sounds are derived and then acoustically output into the cavity 112 by the acoustic driver 190.

The derivation of the feedforward anti-noise sounds takes into account the characteristics of the passive noise reduction provided by the personal ANR device 1000, characteristics and position of the acoustic driver 190 relative to the feedforward microphone 130, and/or acoustic characteristics of the cavity 112 and/or the passage 117. The feedforward anti-noise sounds are acoustically output by the acoustic driver 190 with amplitudes and time shifts calculated to acoustically interact with the noise sounds of the acoustic noise source 9900 that are able to enter into the cavity 112, the passage 117 and/or an car canal in a subtractive manner that at least attenuates them.

In aspects, a feedback microphone 120 is disposed within the cavity 112. The feedback microphone 120 is positioned in close proximity to the opening of the cavity 112 and/or the passage 117 so as to be positioned close to the entrance of an car canal when the earpiece 100 is worn by a user. The sounds detected by the feedback microphone 120 are used as a reference from which feedback anti-noise sounds are derived and then acoustically output into the cavity 112 by the acoustic driver 190. The derivation of the feedback anti-noise sounds takes into account the characteristics and position of the acoustic driver 190 relative to the feedback microphone 120, and/or the acoustic characteristics of the cavity 112 and/or the passage 117, as well as considerations that enhance stability in the provision of feedback-based ANR. The feedback anti-noise sounds are acoustically output by the acoustic driver 190 with amplitudes and time shifts calculated to acoustically interact with noise sounds of the acoustic noise source 9900 that are able to enter into the cavity 112, the passage 117 and/or the car canal (and that have not been attenuated by whatever passive noise reduction) in a subtractive manner that at least attenuates them.

Figure 3:
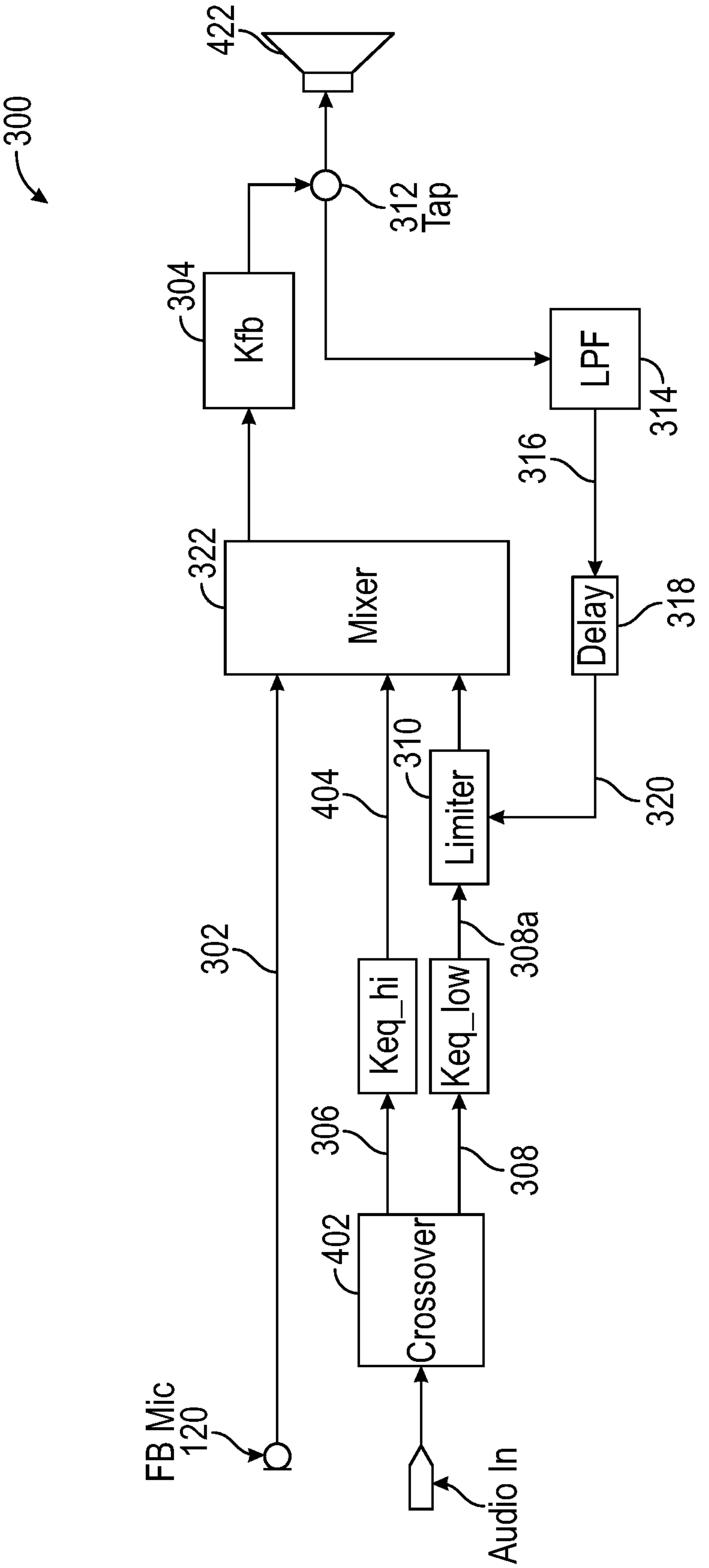
FIG. 3 illustrates an example of an ANR system in accordance with aspects of the present disclosure.
Figure 4:
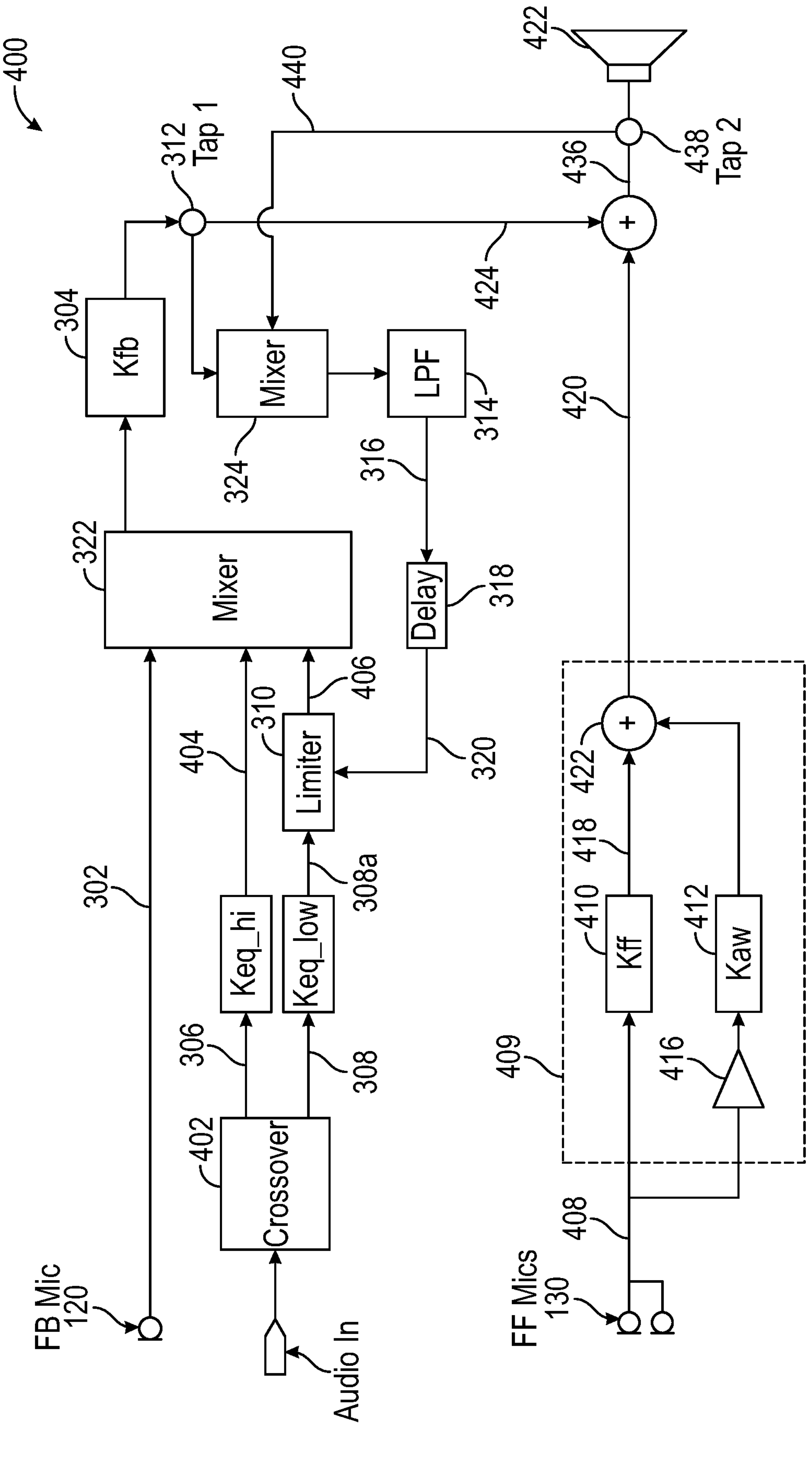
FIG. 4 illustrates an example of an ANR system in accordance with aspects of the present disclosure.

The personal ANR device 1000 further incorporates one of ANR circuit 2000 associated with each earpiece 100 of the personal ANR device 1000 such that there is a one-to-one correspondence of ANR circuits 2000 to earpieces 100. The ANR circuit may include one or more processors configured to execute instructions to control the functionality of the device 1000 including the dynamic, real-time adjustment of the audio limiter 310 (FIGS. 3 and 4).

Either a portion of or substantially all of each ANR circuit 2000 may be disposed within the casing 110 of its associated earpiece 100. Alternatively and/or additionally, a portion of or substantially all of each ANR circuit 2000 may be disposed within another portion of the personal ANR device 1000. Depending on whether one or both of feedback-based ANR and feedforward-based ANR are provided in an earpiece 100 associated with the ANR circuit 2000, the ANR circuit 2000 is coupled to one or both of the feedback microphone 120 and the feedforward microphone 130, respectively. The ANR circuit 2000 is further coupled to the acoustic driver 190 to cause the acoustic output of anti-noise sounds.

In aspects providing pass-through audio, the ANR circuit 2000 is also coupled to an audio source 9400 to receive incoming audio signals from the audio source 9400 to be acoustically output by the acoustic driver 190. The incoming audio signals from the audio source, unlike the noise sounds emitted by the acoustic noise source 9900, is audio that a user of the personal ANR device 1000 desires to hear. In aspects, the incoming audio signals may be a playback of recorded audio, transmitted audio, or any of a variety of other forms of audio that the user desires to hear. In aspects, pass-through audio is received from a communications microphone 140 integrated into variants of the personal ANR device 1000 employed in two-way communications in which the communications microphone 140 is positioned to detect speech sounds produced by the user of the personal ANR device 1000.

In support of the operation of at least the ANR circuit 2000, the personal ANR device 1000 may further incorporate one or both of a memory or storage device 170, a power source 180 and/or a processing device (not shown). In aspects, the ANR circuit 2000 includes the processing device.

Figure 2:
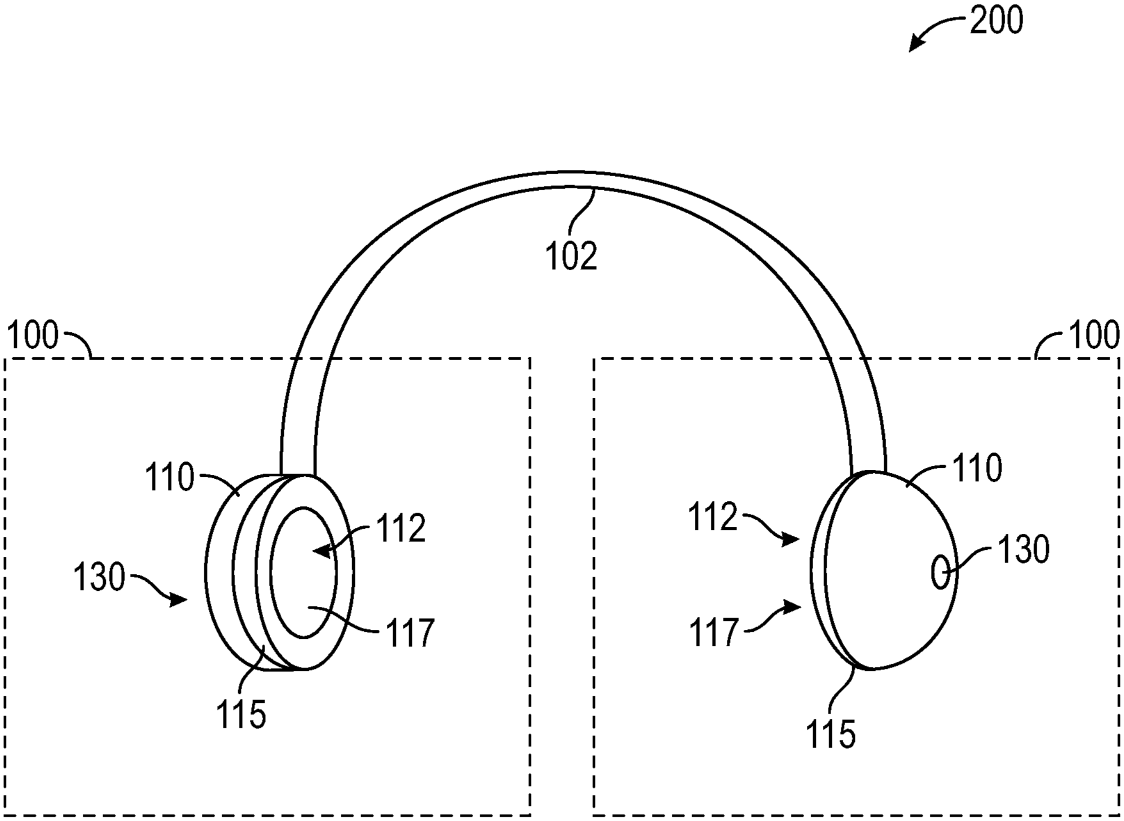
FIG. 2 depicts an over-the-head physical configuration of the personal ANR device of FIG. 1.

FIG. 2 depicts an over-the-head physical configuration 200 of the personal ANR device 1000 that incorporates a pair of earpieces 100 that are each in the form of an earcup, and that are connected by a headband 102. However, and although not specifically depicted, variants of the physical configuration 200 may replace the headband 102 with a different band structured to be worn around the back of the head and/or the back of the neck of a user.

As described above, the ear coupling 115 surrounds an opening to the cavity 112 and has a passage 117 that is formed through the ear coupling 115 and that communicates with the opening to the cavity 112.

Anything that prevents the earcup from making a tight seal with the ear or a user's head may result in a poor or leaky fit. With reference to FIG. 2, a leaky fit occurs when a tight seal does not exist between the ear coupling 115 of the earcup and the user's ear or head. For example, the arms of a user's glasses may interfere with the seal between the earcup and the user's car. Hair between the car coupling 115 or headband 102 and the user's head may also decrease the seal quality between the earcup and the user's ear. In another example, a hat or generally poorly fitting earcups or headband may interfere with the seal quality and degrade a user's listening experience.

Under certain conditions, a leaky fit may cause unwanted distortion between the ANR system and audio playback. The conditions may include high volume and high bass, in combination with a leaky fit between the earcup and the user's head. To address this issue, an audio limiter reduces the amplitude of the bass frequency anytime the volume of the audio playback signal is high. Consequently, current systems limit the audio regardless of the state of the ANR device relative the user's head or ear. If the audio from the playback path is loud and has a lot of bass, the audio limiter reduces the audio output simply because there is a potential for unwanted distortion. This conservative approach limits performance of the ANR device even when unnecessary and the device has more capability. Aspects of the present disclosure provide methods to intelligently use the audio limiter to limit the bass when and to the extent a leaky fit is detected. As compared to current methods, a state dependent audio limiter enables better performance by the ANR device when the fit is good while still decreasing distortion when the fit is poor.

As will be described in more detail below, the audio limiter advantageously and selectively limits the audio when and to the extent needed based on the detected state of the system. If there is a good seal or only a small leak, the intelligent functionality of the audio limiter provides enhanced performance by way of not limiting or appropriately limiting the bass output from the headphones. In contrast, current ANR devices simply reduce the bass of the audio signal. Therefore, the device described herein makes smarter decisions by dynamically adjusting the behavior of the audio limiter depending on the state of the device.

FIG. 3 illustrates an example ANR system 300 in which an audio limiter 310 dynamically adjusts the bass frequency of an incoming audio signal. At least portions of the ANR system 300 may be controlled by the ANR circuit 2000. A feedback microphone 120 picks up a feedback signal 302 that includes noise inside the earcup. The feedback signal 302 is passed through a feedback filter (Kfb) 304. As described below, a tap 312 is located downstream of the feedback filter 304. If only one tap location is selected, the mixer 324 (as illustrated in FIG. 4) is not needed.

Separately, audio that is being injected into the system 300 is split into two paths. The crossover 402 divides the audio into a high frequency portion 306 and a low frequency portion 308. By filtering the incoming audio signal into high frequency and low frequency portions, the ANR system 300 is able to focus on the low frequency portion 308 of the audio, which is the source of the potential problematic distortion. In an effort to mitigate distortion, an audio limiter 310 is provided on the low frequency portion 308 of the audio.

When a leaky fit is detected, the noise inside the earcup will be loud. Accordingly, the filtered feedback signal measured at the tap 312 is predicted to increase in response to a leaky fit. This increase is used to infer or determine the state of the system. The filtered feedback signal is tapped at 312 and, optionally, filtered by a low pass filter 314. The signal 316 (low-pass filtered signal when the low pass filter 314 is present) is then delayed one sample by a delay 318. The delayed signal 320 as well as the filtered low frequency portion 308*a* of the audio signal is fed to the audio limiter 310. The audio limiter 310 dynamically adjusts the bass of the low frequency portion 308 of the incoming audio signal when it is likely to cause audible distortion based on the state of the system interfered or determined from the feedback signal. The audio limiter 310 reduces the amplitude of the first input (308) based on the amplitude of the second input (320). When the fit is poor or leaky and the signal going to the driver is high, the signal at the tap 312 and/or 438 (in FIG. 4) will be large in amplitude. This high amplitude at the second input of the limiter 310 causes it to reduce the amplitude of the low frequency portion of the audio in response. This prevents the system from producing distorted audio, or at least, reduces the amount of distortion.

The mixer 322 is a signal processing block that adds signals together, including the feedback signal 302, a filtered high frequency portion of the audio signal 404, and the low frequency portion of the audio signal 404 after the limiter 310 has acted on it.

By tapping the signal at 312 in real-time and downstream of the feedback filter 304 and sending a version of the tapped signal to the audio limiter 310, the ANR device dynamically adjusts limiting the bass of the incoming audio signal based on the current state of the system. The amount of audio limiting is based on a sliding scale. In an example, a user is wearing the over-the-head ANR device. The earcups form a tight seal with the user's ears. The user then puts on thin, wire framed glasses. The thin glasses create a slight leak. The filtered feedback signal measured at tap 312 will increase and the audio limiter 310 will limit the bass of the audio signal in accordance with the slight leak. The user then removes his glasses. The filtered feedback signal measured at tap 312 now decreases. In response, the audio limiter 310 decreases limiting the bass of the incoming audio signal due to the decreased noise measured at tap 312. The user then removes the headphones, puts on a hat and thick framed sunglasses. The filtered feedback signal measured at tap 312 increases (more than the signal measured at 312 when the user was only wearing thin, wire framed glasses). In response, the audio limiter 310 limits the bass of the audio signal even more than when the user was wearing thin, wire framed glasses.

The above examples describe an audio limiter dynamically adjusting the bass portion of an incoming audio signal based on a measured feedback signal. In aspects, the audio limiter is adjusted based on a signal measured from another tap location or signal measurements from a combination of taps.

FIG. 4 illustrates an example implementation of an ANR system 400 in accordance with aspects of the present disclosure.

The feedback signal 302 from the feedback microphone 120 is input into a mixer 322 and passes through a feedback filter 304. The filtered signal is measured at a first tap location 312 downstream of the feedback filter 304. The measured signal is input into a mixer 324. The mixer 324 selects one of the signals tapped at 312 and 438, or some combination of the two.

Separately, the incoming audio signal is split into two paths. The crossover 402 divides the audio signal into higher frequency 306 and lower frequency 308 portions of the audio signal. As described above, by filtering the incoming audio signal into high frequency and low frequency portions, the ANR system 400 is able to focus on the low frequency portion 308 of the audio, which is the source of the potential problematic distortion. In an effort to mitigate distortion, an audio limiter 310 is provided on the low frequency portion 308 of the audio signal.

As described with respect to FIG. 3, the signal taped at 312 is optionally input into a low pass filter 314 and the low pass filtered signal 316 is delayed via delay block 318. The delayed signal 320 is input into the audio limiter 310. The audio limiter 310 receives the delayed signal 320 as well as the filtered low frequency portion 308*a* of the audio signal. The audio limiter 310 reduces the bass portion of the audio input signal when it is determined to likely cause audible distortion.

The mixer 322 adds signals together, including the feedback signal 302, a filtered high frequency portion of the audio signal 404, and the low frequency portion of the audio signal 404 after the limiter 310 has acted on it.

In aspects, a feedforward signal 408 from feedforward microphone(s) 130 undergo other ANR processing 409 that may include feedforward noise cancellation and aware mode processing, such as described in U.S. Pat. No. 11,087,776, titled "Compressive hear-through in personal acoustic devices". The complete disclosure of U.S. Pat. No. 11,087,776 is incorporated herein by reference As illustrated in FIG. 4, the feedforward signal 408 passes through a feedforward filter 410 to generate a filtered feedforward signal 418. The feedforward filter 410 is disposed in parallel to a combination of a pass-through filter 412 and a variable gain amplifier (VGA) or compressor 416.

In some implementations, the outputs of the ANR path and the pass-through path are combined at 442 (e.g., in a weighted combination) to generate a feedforward signal 420 that drives, at least in part, the acoustic transducer 422. In some implementations, the feedforward signal 420 may be combined with a feedback signal 424. The combined signal 436 may be measured at a second tap 438. The measured signal 440 may be input in the mixer 324. In aspects, the mixer 324 selects the filtered feedback signal measured at tap 312, the measured feedforward signal 440 measured at tap 438, or a combination of the signals to be input into the optional low pass filter 314. The selected signal(s) are delayed by one sample at 318, and fed into the audio limiter 310. The audio limiter 310 in FIG. 4 may dynamically adjust its behavior in real time based on measurements taken at different points in the system as compared to FIG. 3. In this manner, the audio limiter dynamically adjusts its behavior based on real-time signal measurements. The configuration illustrated in FIG. 3, wherein the audio limiter is adjusted based on the feedback signal may be more aggressive than the methods taking the feedforward signal into account.

Aspects described herein are not limited to the specific location of the taps 312 and/or 438. Instead, aspects provide methods for dynamically adjusting the audio limiter in real-time based on a determined state of the ANR device to reduce distortion. Any combination or ratio of measurements from multiple taps may be used to dynamically adjust the audio limiter. The configuration illustrated in FIG. 3, wherein the audio limiter is adjusted based on the feedback signal may be less aggressive than the methods taking the feedforward signal into account.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a non-transitory computer readable medium or any suitable combination of the foregoing. In the current context, a computer readable storage medium can be any tangible medium that can contain, or store a program.

The block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). Each block of the block diagrams and combinations of blocks in the block diagrams and can be implemented by special-purpose hardware-based systems that perform the specified functions or acts, or combinations of special purpose hardware and computer instructions.

A number of implementations have been described. Nevertheless, it will be understood that additional modifications may be made without departing from the scope of the inventive concepts described herein, and, accordingly, other embodiments are within the scope of the following claims.

What is claimed is:

1. A method performed by active noise reduction (ANR) headphones comprising:
- determining a state of the headphones relative to a user wearing the headphones;
- measuring, at a first tap, a feedback signal downstream of a feedback filter in an earcup of the headphones;
- filtering the feedback signal downstream of the feedback filter to generate a low pass filtered feedback signal;
- delaying the low pass filtered signal to generate a delayed, low pass filtered feedback signal; and
- adaptively adjusting an audio limiter based, at least in part, on the determined state and on the delayed, low pass filtered feedback signal.

2. The method of claim 1, wherein the state indicates a characteristic of a fit between the earcup of the headphones and the user's ear or head.

3. The method of claim 1, wherein determining the state of the headphones comprises:
- determining the state of the headphones based, at least in part, on the measured feedback signal.

4. The method of claim 1,
- wherein the state of the headphones relative to the user is determined based on the measured feedback signal.

5. The method of claim 4, wherein adaptively adjusting the audio limiter comprises:
- reducing a bass portion of an incoming audio signal based on the measured feedback signal.

6. The method of claim 5,
- wherein adaptively adjusting the audio limiter comprises adjusting the bass portion of the incoming audio signal based on the delayed, low pass filtered feedback signal.

7. The method of claim 1, wherein determining the state of the headphones comprises:
- determining the state of the headphones based, at least in part, on the feedback signal measured at the first tap or a feedforward signal measured at a second tap.

8. An active noise reduction (ANR) audio output device, comprising:
- a memory comprising computer-executable instructions; and
- a processor configured to execute the executable instructions and cause the audio output device to:
  - determine a state of the audio output device relative to a user wearing the audio output device;
  - measuring, at a first tap, a feedback signal downstream of a feedback filter in an earcup of the headphones;
  - filtering the feedback signal downstream of the feedback filter to generate a low pass filtered feedback signal;
  - delaying the low pass filtered signal to generate a delayed, low pass filtered feedback signal; and
  - adaptively adjust an audio limiter based, at least in part, on the determined state and on the delayed, low pass filtered feedback signal.

9. The ANR audio output device of claim 8, wherein the state indicates a characteristic of a fit between the earcup of the audio output device and the user's ear or head.

10. The ANR audio output device of claim 8, wherein the computer-executable instructions for determining the state of the audio output device comprise instructions for determining the state of the audio output device based, at least in part, on the measured feedback signal.

11. The ANR audio output device of claim 8, wherein the state of the audio output device relative to the user is determined based on the feedback signal.

12. The ANR audio output device of claim 11, wherein the computer-executable instructions for adaptively adjusting the audio limiter comprise instructions for reducing a bass portion of an incoming audio signal based on the measured feedback signal.

13. The ANR audio output device of claim 12, wherein adaptively adjusting the audio limiter comprises adjusting the bass portion of the incoming audio signal based on the delayed, low pass filtered feedback signal.

14. The ANR audio output device of claim 8, wherein the computer-executable instructions for determining the state of the ANR audio output device comprise instructions for determining the state of the audio output device based, at least in part, on the feedback signal measured at the first tap or a feedforward signal measured at a second tap.

15. A non-transitory computer-readable medium comprising executable instructions that, when executed by a processor of active noise reduction (ANR) headphones, cause the ANR headphones to perform operations comprising:

determining a state of the headphones relative to a user wearing the headphones;

measuring, at a first tap, a feedback signal downstream of a feedback filter in an earcup of the headphones;

filtering the feedback signal downstream of the feedback filter to generate a low pass filtered feedback signal;

delaying the low pass filtered signal to generate a delayed, low pass filtered feedback signal; and adaptively adjusting an audio limiter based, at least in part, on the determined state and on the delayed, low pass filtered feedback signal.

16. The non-transitory computer-readable medium of claim 15, wherein the state indicates a characteristic of a fit between the earcup of the headphones and the user's ear or head.

17. The non-transitory computer-readable medium of claim 15, wherein determining the state of the headphones comprises:

determining the state of the headphones based, at least in part, on the measured feedback signal.

18. The non-transitory computer-readable medium of claim 15, wherein the state of the headphones relative to the user is determined based on the measured feedback signal.

19. The non-transitory computer-readable medium of claim 18, wherein adaptively adjusting the audio limiter comprises:

reducing a bass portion of an incoming audio signal based on the measured feedback signal.

20. The non-transitory computer-readable medium of claim 19, wherein adaptively adjusting the audio limiter comprises adjusting the bass portion of the incoming audio signal based on the delayed, low pass filtered feedback signal.

* * * * *